May 19, 1970 — W. F. DALEY — 3,512,362

COLLOID THRUSTOR EXTRACTOR PLATE

Filed Feb. 21, 1968

William F. Daley,
INVENTOR

BY

Donald W. Graves

ATTORNEY.

United States Patent Office 3,512,362
Patented May 19, 1970

3,512,362
COLLOID THRUSTOR EXTRACTOR PLATE
William F. Daley, Los Angeles, Calif., assignor to TRW Inc., Redondo Beach, Calif., a corporation of Ohio
Filed Feb. 21, 1968, Ser. No. 707,076
Int. Cl. H05h 1/00
U.S. Cl. 60—202     5 Claims

ABSTRACT OF THE DISCLOSURE

To prevent shorting of a cathode and an anode by propellant upon shutting down of a colloid thrustor, parallel extractor plates are provided which causes the propellant, by capillary action, to be physically removed as a shortening agent between the cathode and the anode.

BACKGROUND OF THE INVENTION

The field to which this invention is directed is in the area of thrust producing devices such as small attitude control rocket engines in space. There are many types of attitude control engines which have been proposed in the past. These include ion engines. Another type of engine is the plasma type rocket engine. A popular form of attitude control engines are those powered by radioisotope capsules such as disclosed in U.S. Pat. No. 3,315,471. These attitude control engines are typically of very small thrust.

To conserve on weight, it is necessary that the specific impulse (I.SP.) be as high as practicable. The ordinary chemical reaction type of engine such as found in the present day boosters and sustainer engines have a low specific impulse which is not practical for small thrust applications since the amount of fuel necesary to be carried aboard the vehicle is prohibitive. Specific impulse may be defined as the thrust divided by mass flow rate of propellant and is expressed in seconds. A typical booster engine has an I.SP. of 200–300 seconds.

DESCRIPTION OF THE PRIOR ART

One of the more promising types of attitude control engines is the colloid thrustor. This engine operates on the principle of applying a high voltage between an extractor plate and a capillary tube containing a conductive propellant. One example of such a conductive propellant is a mixture of sodium iodide and glycerol.

SUMMARY OF THE INVENTION

The colloid thrustor experiences one disadvantage which is as follows. When the engine is operating, the high voltage applied between the extractor plate and the conductive propellant carrying capillary tube accelerates the conductive fluid, thus providing thrust. However, it has been found that when the engine is shut down, the propellant has a tendency to merge from the tube and contacts the extractor plate. When the engine is fired again this fluid acts as a conductor between the extractor plate (anode) and the capillary tube (cathode). This problem is solved in the instant invention by providing an additional extractor plate in a closely adjacent position to the first extractor plate so as to provide a capillary effect to draw the drop of propellant therebetween whereby the possibility of shorting is removed.

DESCRIPTION OF THE PREFERRED EMBODIMENT

Figure 1:
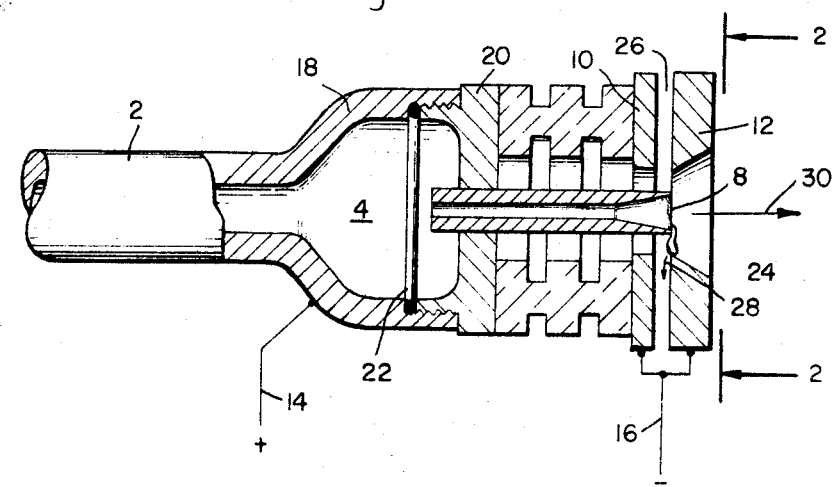
FIG. 1 is a view partially in cross section illustrating a colloid thrustor constructed according to this invention.

Referring to FIG. 1 there is shown a colloid thrustor engine constructed according to this invention. A propellant delivery tube 2 delivers propellant to cavity 4 from which it passes into capillary tube 6. Capillary tube 6 is typically constructed of platinum.

The propellant exists through opening 8 of tube 6 and when accelerated by a high voltage difference between tube 6 and extractor plates 10 and 12 will produce thrust. As shown schematically by lines 14 and 16, a voltage potential is maintained between plates 10, 12 and capillary tube 6. Relative to the specific craft on which the thrustor is located, the cathode is maintained for example of 8 kilovolts and the anode at minus 300 volts.

Figure 3:
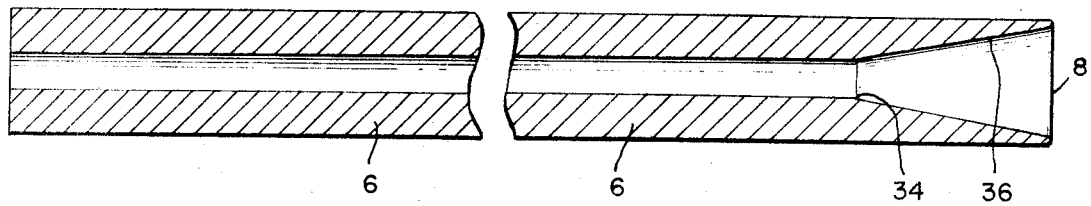
FIG. 3 is a closeup view in cross section with portions broken away illustrating the configuration of the capillary tube.
Figure 2:
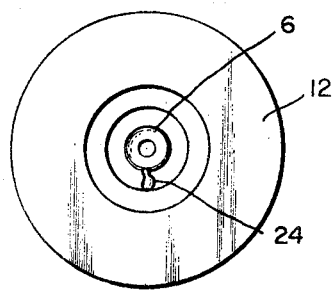
FIG. 2 is a front view of the engine illustrated in FIG. 1 as shown by lines 2—2.

As shown in FIG. 3, the capillary tube 6 is shown in an enlarged view. The internal diameter rearward of point 34 is approximately .004 inch. The opening 8 is formed by the wall 36 which diverge from point 34 at an inclusive angle of approximately 20°. The length of the capillary tube is approximately 1 inch.

Ordinarily, assuming that extractor plate 10 is not present, the voltage would be applied to capillary tube 6 through housing 18 and retainer structure 20 ( which are conductive) between which a seal 22 is provided to prevent leakage. Extractor plate 12 has a negative voltage applied so that a large voltage potential exists between capillary tube 6 and plate 12. When the engine is shut down by removing the voltage and/or cutting off the propellant, a residual amount of propellant 24 is often trapped between tube 6 and plate 12. Since the fluid is conductive, a subsequent firing of the engine will result in a short between tube 6 and plate 12.

To obviate this occurrence, a second conductive plate 10 is provided to provide a capillary space 26. The residual fluid or propellant is drawn by this capillary space as shown by arrow 28 into this capillary space leaving an open condition between tube 6 and extractor plates 10 and 12.

In operation, the propellant is fed under slight pressure into capillary tube 6 and exits at open end 8. The high voltage potential between the tubes and the plates accelerates the fluids in a direction shown by arrow 30. When the engine is shut off, the conductive propellant will be drawn toward extractor plates 10 and 12. However, because of the capillary space 26, the fluid will be drawn through and away from tube 6 thus preventing a shorting out of the electrodes upon a subsequent application of voltage.

What is claimed is:

1. In a colloid thrustor wherein conductive fluid is fed through a conductive capillary tube and is adapted to be exposed to a voltage drop between said tube and a first extractor plate adjacent one end of said tube, that improvement which comprises;
    a second extractor plate, said second plate being in a closely adjacent juxtaposed position with said first plate so as to form a capillary path therebetween and being electrically connected thereto,
    whereby when the voltage drop between said plates and said tube is turned off and a quantity of fluid remains at the end of said tube, said fluid will be drawn by capillary action from said tube to between said plates to prevent a subsequent short circuit between said tube and said plates.

2. A colloid thrustor according to claim 1 in which said first and second extractor plates are annular whereby to provide an annular capillary space between them.

3. A colloid thrustor according to claim 1 wherein said conductive fluid comprises a mixture of sodium iodide and glycerol.

4. A colloid thrustor according to claim 1 wherein said capillary tube is constructed substantially of platinum.

5. A colloid thrustor according to claim 1 wherein said voltage drop is in excess of 8 kilovolts.

References Cited

UNITED STATES PATENTS

| | | | |
|---|---|---|---|
| 3,122,882 | 3/1964 | Schultz et al. | 60—202 |
| 3,173,246 | 3/1965 | Norgren | 60—202 |
| 3,233,404 | 2/1966 | Huber et al. | 60—202 |
| 3,263,127 | 7/1966 | Point et al. | 239—3 |

SAMUEL FEINBERG, Primary Examiner

U.S. Cl. X.R.

313—63, 231